United States Patent [19]

Ohasi

[11] Patent Number: 4,919,297
[45] Date of Patent: Apr. 24, 1990

[54] FUEL INJECTION PORT

[75] Inventor: Tamiyosi Ohasi, Aichi, Japan

[73] Assignee: Toyoda Gosei Co., Ltd., Nishikasugai, Japan

[21] Appl. No.: 318,182

[22] Filed: Mar. 2, 1989

[30] Foreign Application Priority Data

| Mar. 7, 1988 [JP] | Japan | 63-053383 |
| Jun. 14, 1988 [JP] | Japan | 63-146148 |
| Oct. 17, 1988 [JP] | Japan | 63-261152 |

[51] Int. Cl.$^5$ .............................................. B67D 5/04
[52] U.S. Cl. ................................. 220/86 R; 55/168; 141/285
[58] Field of Search ............... 220/86 R; 141/45, 285, 141/286; 55/168, 88, 387

[56] References Cited

U.S. PATENT DOCUMENTS

| 4,702,386 | 10/1987 | Boehmer | 220/86 R |
| 4,770,677 | 9/1988 | Harris | 220/86 R |
| 4,809,864 | 3/1989 | Neuthard | 220/86 R |
| 4,836,835 | 6/1989 | Harris | 55/168 |

OTHER PUBLICATIONS

SAE Technical Paper Series: A Comparison of Refueling Emissions Control with Onboard and Stage 11 Systems; Thomas C. Austin and Gary S. Rubenstein; Sierra Research, Inc.

Primary Examiner—George E. Lowrance
Attorney, Agent, or Firm—Cushman, Darby & Cushman

[57] ABSTRACT

A fuel injection port of the invention is provided with a seal member enlarging surface which face to a seal member to seal outer circumferential surface of a nozzle and enlarges the seal member. Further a moving member which moves in following the nozzle is installed, and the seal member or the seal member enlarging surface is moved by moving member. When the nozzle is inserted, abutting of both members is performed thereby the seal member is enlarged and the nozzle does not interfere with the seal member. After the nozzle is inserted, both members are separated and the seal member is closely contacted with outer circumferential surface of the nozzle.

19 Claims, 12 Drawing Sheets

FUEL INJECTION PORT

BACKGROUND OF THE INVENTION

The present invention relates to a fuel injection port of a fuel tank, and is suitable for vehicles.

In the prior art, for example, constitution of a fuel injection port 1 for automobiles is as shown in FIG. 1. The fuel injection port 1 is a cylindrical member projected from the right side wall of a fuel tank 3 towards the right-hand upper oblique direction. Numeral 5 in the figure designated a breather hose, numeral 6 designates a roll-over valve, and numeral 7 designates a canister. A fuel injection nozzle 9 is inserted in the fuel injection port 1 and a fuel 11 is injected into the tank 3.

As shown in FIG. 2, a fuel injection port 10 provided with a seal member (seal means) 14 in the inner circumferential surface is proposed (refer to SAE technical paper 851204). In FIG. 2, numeral 15 designates a retainer, and numeral 17 designates a trap door. In the fuel injection port 10, when the nozzle 9 is inserted, the trap door 17 is opened to the back side and the seal member 14 continues to the outer circumferential surface of the nozzle 9 in the circumferential direction and is closely contacted therewith (refer to FIG. 3). Thereby the air tightness is held within the tank 3 ever during the fuel injection.

In the fuel injection port 10 of FIG. 2, however, when the nozzle 9 is inserted, its top and portion (the surface usually having a number of flaws) interferes with the seal member 14 and may flaw this. In the flawed seal member 14, the air tightness of the tank is deteriorated and this state is not preferable.

SUMMARY OF THE INVENTION

An object of the invention is to protect seal means from a nozzle and to prevent the seal means from being flawed.

In order to attain the above object, in a fuel injection port of the invention, a seal means enlarging surface is installed, and at least immediately before the nozzle is inserted in the fuel injection port the seal means enlarging surface abuts on the seal means thereby the seal means is enlarged, and moving means, which follows the nozzle and moves the seal means or the seal means enlarging surface and separates both from each other and releases the enlarging of the seal means, is arranged.

Another object of the invention is to prevent the seal means from permanent deformation in that the seal means enlarging surface abuts on the seal means and to prevent mutual adhesion of both.

In order to attain the above object, the fuel injection port of the invention is provided with second moving means which is interlocked with a cap of the fuel injection port and moves the seal means or the seal means enlarging surface and separates between both members and releases the enlarging of the seal means.

Still another object of the invention is to reduce the number of parts of the fuel injection port.

In order to attain the above object, in the fuel injection port of the invention, the rear surface of the guide means fixed to the casing for guiding the nozzle to the seal means is applied as the seal means enlarging means.

Still another object of the invention is to secure the seal property between the nozzle and the seal means during the oil supply.

In order to attain the above object, the fuel injection port of the invention uses the moving means composed of cam means which abuts on the nozzle and is rotated and cam follower means to the cam means which cam follower means is connected to the seal means or the seal means enlarging surface. Thereby while the nozzle is inserted, the seal means or the seal means enlarging surface is moved so that both members are separated from each other.

In order to secure the actuation of the moving means further, the invention is provided with second guide means which guides the nozzle to the cam means.

If the actuation of the moving means is secured as above described, when the nozzle is inserted in the fuel injection port, the seal means is securely separated from the seal means enlarging surface and the seal means is closely contacted with the circumferential surface of the nozzle securely.

Still another object of the invention is to release the tank inner pressure during the oil supply.

In order to attain the above object, the fuel injection port of the invention is provided with a valve mechanism.

Further object of the invention is to reduce the number of ports.

In order to attain the above object, in the fuel injection port of the invention, moving means with V-like cross-section is formed by member having spring elasticity, and the inside surface abuts on the nozzle and the outside surface is made the seal means enlarging surface. In this construction, if the nozzle is inserted in the fuel injection port, since the inside surface of the moving means abuts on the nozzle and the moving means follows the nozzle and is moved, the seal means enlarging surface being the outside surface of the moving means is separated from the seal means and the enlarging of the seal means is released. Thus the moving means and the seal means enlarging surface become one member.

DESCRIPTION OF THE PREFERRED EMBODIMENTS

First Embodiment (FIGS. 4~7)

Figure 1:
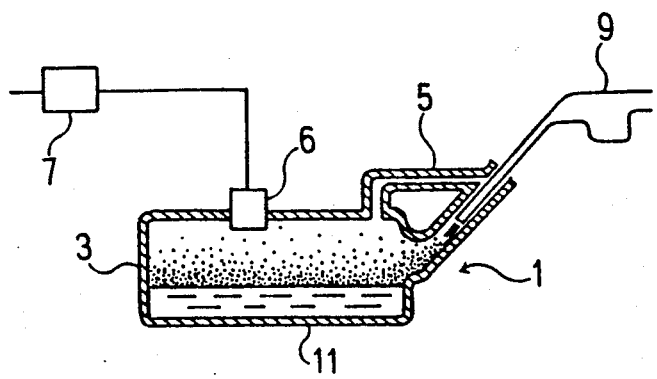
FIG. 1 is a sectional view of a fuel injection port 1 in the prior art.
Figure 2:
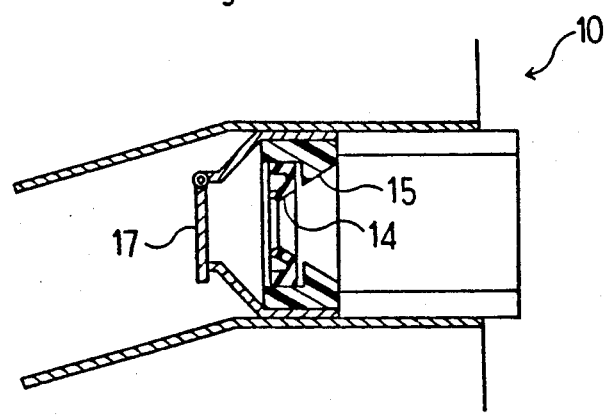
FIG. 2 is a sectional view of a fuel injection port 10 as another example in the prior art.
Figure 3:
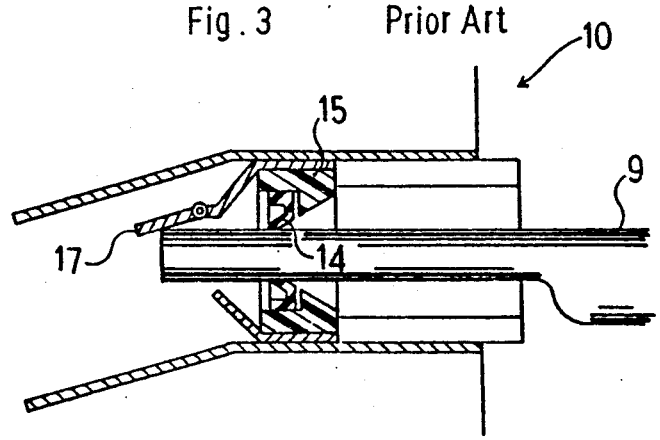
FIG. 3 is a sectional view illustrating state that a nozzle 9 is inserted in a fuel injection port 10.
Figure 4:
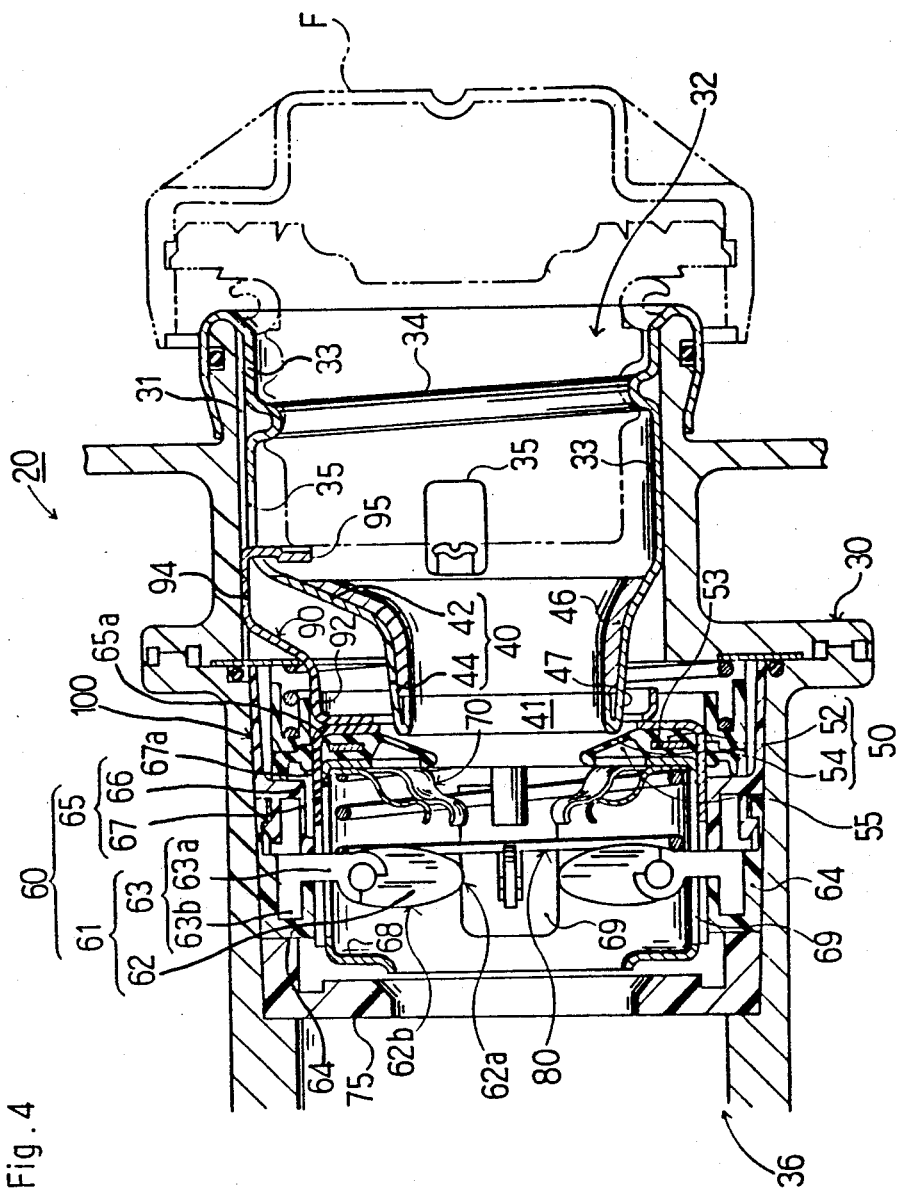
FIG. 4 is a sectional view illustrating state that a fuel cap F is inserted in a fuel injection port 20 in a first embodiment.

A fuel injection port 20 of this embodiment, as shown in FIG. 4, is composed of (1) a casing 30, (2) a nozzle guide member 40, (3) a seal member 50, (4) a first moving member 60, (5) a compression coil spring 80, (5) a second moving member 90, and (6) a valve mechanism 100.

(1) The casing 30 is a cylindrical member, and an opening portion at the right side of the figure is an inlet 32. A cylindrical cover 33 is installed to an inner circumferential surface of the inlet 32. Portion covered by the cover 33 in the casing 30 is provided with three grooves 31 formed in the axial direction. The right end of the cover 33 in the figure is turned to the outside and fitted to a circumferential edge of the inlet 32. In the inner circumferential surface of the cover 33, a projecting stripe portion 34 threadedly engaged with a fuel cap F is formed and a window 35 is bored. The left side of the cover 33 in the figure continues to the nozzle guide member 40 as hereinafter described. An opening portion at the left side of the casing 30 is an outlet 36 continuing to the fuel tank. The casing 30 is fixed to the body of the vehicle.

(2) The nozzle guide member 40 as nozzle guiding means is a cylindrical member comprising a portion 42 decreasing in diameter from the cover 33 and a nearly straight portion 44. A reinforcement member 46 to maintain diameter of a guide port 41 is applied to the inner circumferential surface of the nozzle guide member 40.

Figure 5:
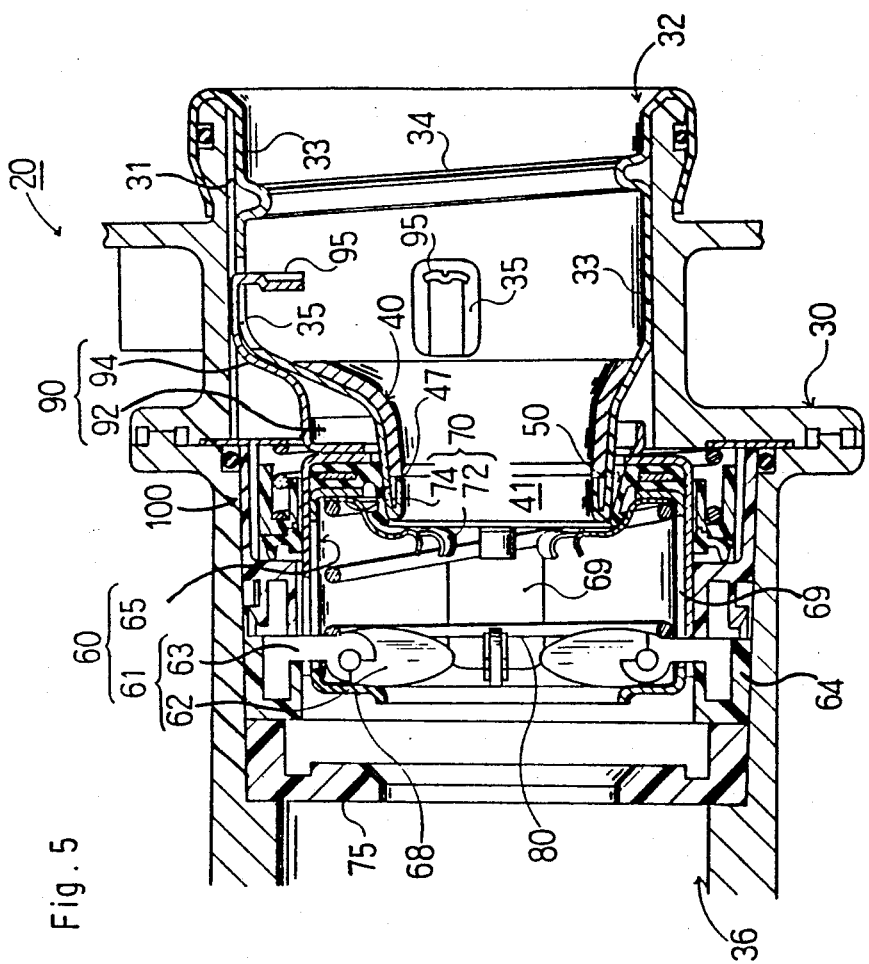
FIG. 5 is a sectional view illustrating state that the fuel cap F is removed from the fuel injection port 20.

The outer circumferential surface of the straight portion 44 becomes a seal member enlarging surface 47 to enlarge the seal member 50 (refer to FIG. 5). That is, if the seal member 50 is moved to the right in the figure, a seal member body 54 rides on the seal member enlarging surface 47 and is enlarged. Thereby when the nozzle 21 is inserted in the furel injection port 20, the top end of the nozzle 21 and the seal member 50 do not interfere with each other.

A slit may be formed in the nozzle guide member 40 from the viewpoint of making it light weight or the like.

Also the seal member enlarging surface 47 is preferably subjected to surface processing to reduce the frictional resistance (such as teflon processing). Thereby load of a compression coil spring (spring coefficient) hereinafter described can be decreased. In this construction, moving of a cam follower member 65 hereinafter described to the left in the figure becomes smooth.

(3) The seal member 50 as seal means is an annular member formed by NBR (nitrile rubber), and composed of a base portion 52 and a seal member body 54 being thinner than the base portion 52.

The base portion 52 has an insert 53 embedded therein, and is fixed in air tightness state to a holding portion 65a formed to the right end of the cam follower member 65 as hereinafter described. Mode of fixing of the base portion 52 is not particularly limited as long as the air tightness state to the holding portion 65a can be maintained, and tight fit, screw fixing, thread fixing, adhesion or the like may be adopted.

The seal member body 54 to construct the inner circumferential surface of the seal member 50 is provided with a rib 55 formed to the left side surface (back side surface) in the figure so that the thin seal member body 54 is prevented from being deformed (turned up) randomly.

Forming material of the seal member 50 is not particularly limited as long as the seal member body 54 is closely contacted with the outer circumferential surface of the nozzle 21 and suitable seal property can be obtained between the seal member body 54' and the nozzle 21, and the material has oil resistance, heat-resisting property, low temperature resistance, weather resistance or the like. In addition to the above-mentioned NBR, synthetic rubber such as fluororubber or fluorosilicone rubber, or elastic high-molecular material such as thermoplastic elastomer in polyester series, polyvinylchloride series, polyurethane series or the like may be used. At least the seal member body 54 may be formed by the elastic high-molecular material.

(4) The first moving member 60 as moving means is composed of a cam member 61 and a cylindrical cam follower member 65.

The cam member 61 comprises a cam body 62 and a bearing 63. The cam body 62 is provided with a surface 62a contacting with the outer circumferential surface of the nozzle 21 and a surface 62b contacting with the cam follower member 65. The bearing 63 is an L-like member, and receives the shaft of the cam body 62 rotatable by a portion 63a at the inside in the figure. A portion 63b at the outside in the figure is fitted to a holding portion 64 fixed to the inner circumferential surface of the casing 30.

The cam follower member 65 comprises two cylindrical members 66 and 67 overlaid. The cylindrical member 66 in the inside is decreased in diameter at the left end in the figure, and the diameter decreased portion becomes an abutting portion 68 to the cam body 62. A window 69 to pass the cam member 61 therethrough is bored nearly on the center of the cam follower member 65. The four windows 69 are formed (spaced by about 90 degrees from each other) corresponding to the cam member 61.

The upper surface of the cylindrical member 67 is an annular seal surface 67a.

The right end of the cylindrical members 66, 67 is bent to the inside thereby a holding portion 65a is formed. The base portion 52 of the seal member 50 is held to the holding portion 65a in maintaining the air tightness state.

In the first moving member 60 in such construction. When the nozzle 21 is inserted in the fuel injection port 20, the cam portion 61 follows the nozzle 21 and is rotated. Then the cam follower member 65 is pushed by the cam portion 61 and moved to the left in the figure. When the cam follower member 65 is moved, the seal member 50 is also moved from the state of FIG. 5 to the left in the figure and separated from the seal member enlarging surface 47 and closely contacted with the nozzle 21.

The second guide member 70 as second guiding member is arranged inside of the first moving member 60 at the right end in the figure. The second guide member 70 may be dispensed with.

Figure 6:
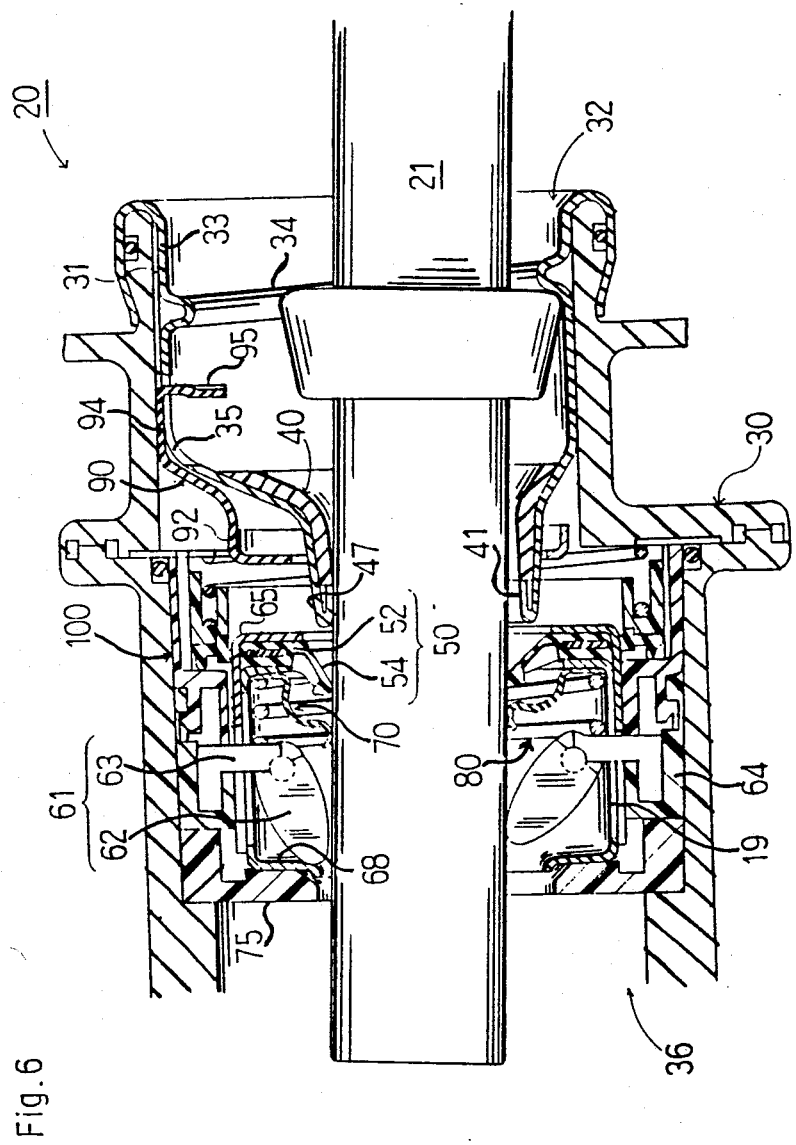
FIG. 6 is a sectional view illustrating state that a nozzle 21 is inserted in the fuel injection port 20.

The second guide member 70 is composed of an arm portion 72 and a base portion 74 (refer to FIGS. 5,6). The base portion 74 is an annular member and fixed to the cylindrical member 66. The fixing mode is usual method such as welding, thread fixing or the like.

The arm portion 72 is a belt-shaped member and formed from the base portion 74 towards the orbit of the nozzle 21. The arm portion 72 is formed in eight elements spaced uniformly from each other. The free end of each arm element 72 is bent. Dimension (diameter) of the imaginary circle formed by the free end is smaller than that of the outer circumferential surface of the nozzle 21. Since each arm element 72 is formed by material having spring elasticity, when the nozzle 21 is inserted in the fuel injection port 20 (FIG. 6), each arm element 72 is in tight fit state having spring elasticity to the outer circumferential surface of the nozzle 21 so that the insertion orbit of the nozzle 21 stabilized.

Before the nozzle 21 abuts on the cam member 61, the tight fit state can be maintained and the cam follower member 65 can be moved to the back side.

That is, the auxiliary function of the first moving member 60 can be effected.

Numeral 75 in the figure designates a stopper of the cam follower member 65. In order to stop the cam follower member 65 at prescribed position, rotational amount of the cam body 62 may be limited (for example, the bearing 63 may be provided with a stopper).

(5) The compression coil spring 80 is installed between the bearing 63 of the cam member 61 and the base portion 74 of the second guide member 70. Since the bearing 63 is fixed to the casing 30, the base portion 74 is biased to the right side in the figure. Since the base portion 74 is fixed to the cam follower member 65 and further the seal member 50 is fixed to the cam follower member 65, by the compression coil spring 80, the seal member 50 abuts on the seal member enlarging surface 47 of the nozzle guide member 40 and is enlarged as shown in FIG. 5.

(6) The second moving member 90 as second moving means is composed of an annular pushing member 92 and a cap receiving member 94 extending from the pushing member 92 to the right side in the figure, and is arranged movable in the axial direction between the nozzle guide member 40 and the casing 30.

The pushing member 92 abuts on the right end of the cam follower member 65 in the figure.

The cap receiving member 94 is formed on the upper side in the three belt-shaped elements spaced by 90 degreed from each other and installed in slip pair to the grooves 31 of the casing 30 respectively. Free end 95 of the cap receiving portion 94 is bent to the center direction. Each free end 95 is projected from the window 35 of the cover 33. The free end 95 abuts on the top end of the fuel cap F as shown in FIG. 4.

The pushing member 92 and the cap receiving member 94 are rigid bodies (made of metal material) respectively, and the distance between the free end 95 of the cap receiving member 94 and the pushing member 92 is held constant. Consequently, if the fuel cap F is threadedly engaged with the fuel injection port 20, as shown in FIG. 4, the cam follower member 65 is urged to the left side in the figure by the second moving member 90, and the seal member 50 is separated from the seal member enlarging surface 47.

Figure 7:
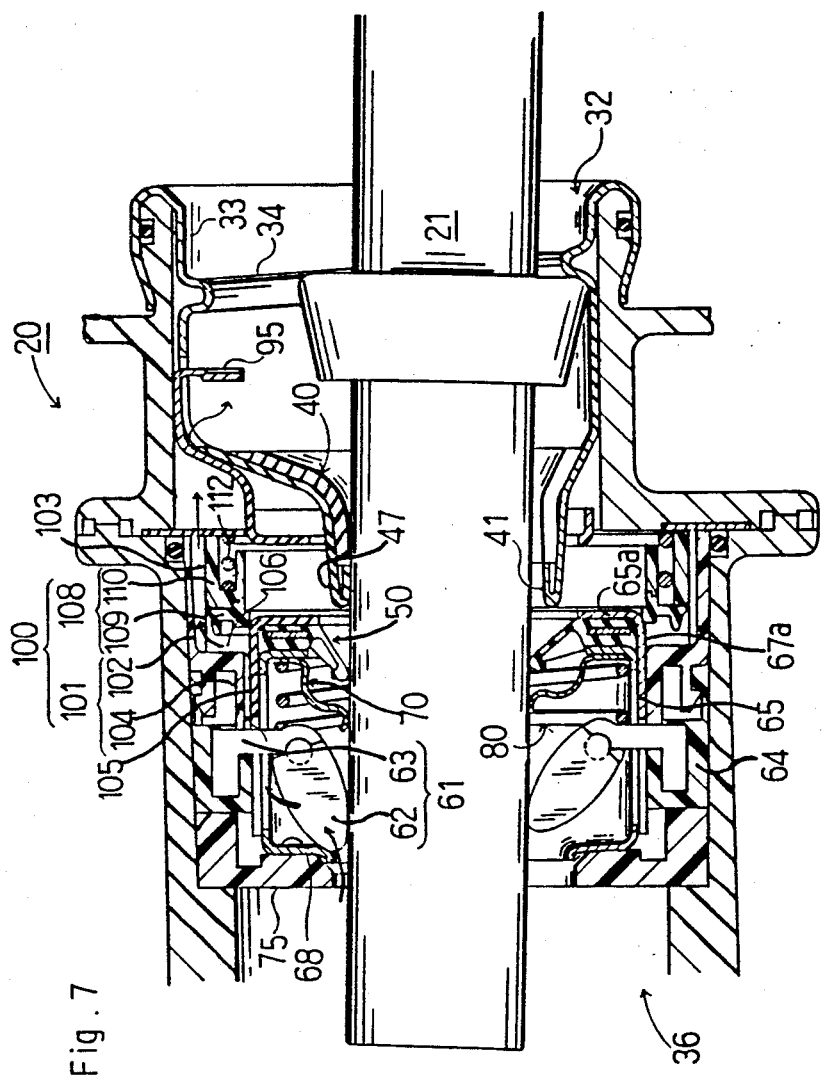
FIG. 7 is a sectional view illustrating a valve mechanism 100 which releases the tank inner pressure.

(7) The valve mechanism 100 is composed of the cylindrical member 101 and the valve body 108 as shown in FIG. 7.

The cylindrical member 101 is provided with a large diameter portion 102 and a small diameter portion 104, and fixed to the inner circumferential surface of the casing 30. A plurality of axial grooves 103, 105 are formed respectively on the large diameter portion 102 and the small diameter portion 104. The stepped portion (vertical plane) between the large diameter portion 102 and the small diameter portion 104 becomes a valve seat 106.

The valve body 108 comprises an annular gasket 109 and a support bed 110 thereof, and is pushed to the valve seat 106 by the compression coil spring 112. Thereby the seal property can be obtained between the valve seat 106 and the gasket 109 (FIGS. 4, 5, 6). The gasket 109 is grasped by the large diameter portion 102 and the annular seal surface 67a of the cam follower member 65, and the seal property is always maintained between the gasket 109 and the annular seal surface 67a. Consequently, in the state of FIGS. 4, 5, 6, the seal property is maintained in the nozzle 21—the seal member 50—the cam follower member 65—the gasket 109—the valve seat 106.

However, when the tank inner pressure rises, the valve body 108 is moved by the pressure to the right side in the figure (FIG. 7). Thereby, as shown by arrow in FIG. 7, the inside of the tank communicates with the outside air through the groove 105 of the small diameter portion 104→portion between the valve seat 106 and the gasket 109→the groove 103 of the large diameter portion 102. Consequently, the inner pressure of the fuel tank is released.

Next, function of the fuel injection port 20 of this embodiment will be decribed.

State that the fuel cap F is installed (FIG. 4)

In this state, the free end 95 of the cap receiving member 94 is urged to the left side in the figure by the end of the fuel cap F. Consequently, the pushing member 92 urges the cam follower member 65 to the left side in the figure. Thereby the seal member 50 is separated from the seal member enlarging surface 47.

This state is general use state of vehicles. Since the seal member 50 is held to the no-load state during this state, the permanent deformation scarcely occures in the seal member 50. Also even if the vehicle is exposed to extraordinary high temperature state, the seal member 50 made of synthetic rubber does not adhere to the seal member enlarging surface 47.

State that the fuel cap F is removed (FIG. 5)

If the fuel cap F is removed from the fuel injection port 20, the cam follower member 65 and the second moving member 90 are pushed by the spring 80 and moved to the right side in the figure into state of FIG. 5. In this state, the seal member 50 rides on the seal member enlarging surface 47 and is enlarged. Viewing this from the side of the inlet 32, the seal member 50 is hidden in the back of the nozzle guide member 40. Consequently, when the nozzle 21 is inserted in the fuel injection port 20, the top end of the nozzle 21 does not interfere with the seal member 50.

State that the nozzle 21 is inserted (FIG. 6)

If the nozzle 21 is inserted in the fuel injection port 21, the nozzle 21 is guided to prescribed orbit by the nozzle guide member 40. If the nozzle 21 is further inserted, the nozzle 21 is contacted with the surface 62a of the cam body 62 thereby the cam body 62 at the upper side in the figure is rotated clockwise. Then the nozzle 21 is guided accurately to the cam member 61 because of existence of the second guide member 70. Consequently the surface 62b of the cam body 62 abuts on the abutting portion 68 of the cam follower member 65 and pushes this to the back side of the fuel injection port (to the left side in the figure). Thereby the cam follower member 65 is moved to the left side in the figure.

In the state of FIG. 6, the seal member 50 is separated from the seal member enlarging surface 47, and the inner circumferential surface 54 of the seal member 50 continues to the outer circumferential surface of the nozzle 21 in the circumferential direction and is closely contacted therewith. Thereby the inside of the tank and the outside air are interrupted.

Also because of existence of the cam member 61, the cam follower member 65 is fixed in the state of FIG. 6. Consequently the cam follower member 65 is not returned to the state of FIG. 5 (If the state of FIG. 5 occurs during the oil supply, the seal member 50 is separated from the nozzle 21 and the inside of the tank communicates with the outside air needlessly) as long as the nozzle 21 is inserted in the fuel injection port 20.

If the oil supply is finished and the nozzle 21 is pulled, the cam body 62 is rotated counterclockwise and the pushing to the cam follower member 65 is released. Then due to the biasing force of the spring 80 the seal member 50 rides on the seal member enlarging surface 47 and is returned to the state of FIG. 5.

If the fuel cap F is inserted again in the fuel injection port 20, the second moving member 90 is moved to the left side in the figure and reset to the state of FIG. 4.

Figure 8:
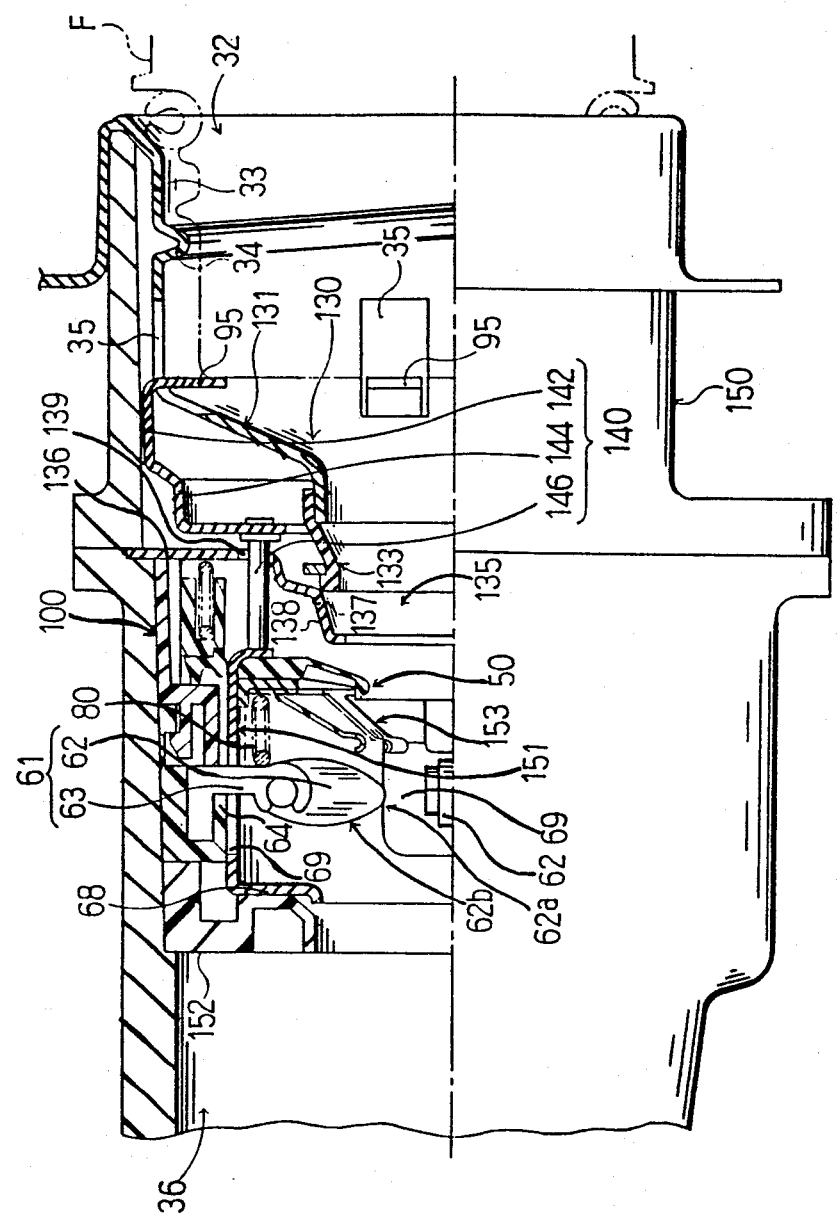
FIG. 8 is a semi-sectional view of a fuel injection port 120 in a second embodiment.

Second Embodiment (FIG. 8)

A fuel injection port 120 of this embodiment is characterized in construction of a nozzle guide member 130 and a second moving member 140 in comparison with the fuel injection port 20 of the first embodiment.

A casing 150, a cam follower member 151, a stopper 152, a second guide member 153 and the like and different respectively from those of the first embodiment in shape but perform the essentially the same function.

The nozzle guide member 130 is composed of a diameter decreasing portion 131 continuing to the cover 33, an intermediate portion 133 externally installed to the left end of the diameter decreasing portion 131 in the figure, and a seal protective portion 135 installed to the back (to the left side in the figure) of the intermediate portion 133. The seal protective portion 135 comprises a flange portion 136 fixed to the casing 150 and a body portion 137, and a hole 139 to pass a pushing pin 140 of the second moving member 140 therethrough is bored on the flange portion 136. The outer circumferential surface of the body portion 137 is made a seal member enlarging surface 138. That is, if the fuel cap F is removed from the state of FIG. 8, the cam follower member 151 and the second moving member 140 are moved to the right side in the figure by the spring 80 as biasing means. Consequently the seal member 50 rides on the seal member enlarging surface 138 and does not interfere with the nozzle 21.

The second moving member 140 is composed of an arm portion 142, a base portion 144 and a pushing pin 146. The arm portion 142 and the base portion 144 have similar construction to those in the first embodiment. The pushing pin 146 is projected from the base portion 144 to the left side in the figure. Four pushing pins 146 are arranged and spaced by 90 degrees from each other, although only one appears in the figure.

The fuel injection port 120 in such construction performs the same function as that of the first embodiment.

From the viewpoint of the number of parts, the fuel injection port 20 of the first embodiment is preferable to that of the second embodiment because the number of parts may be little.

Figure 9:
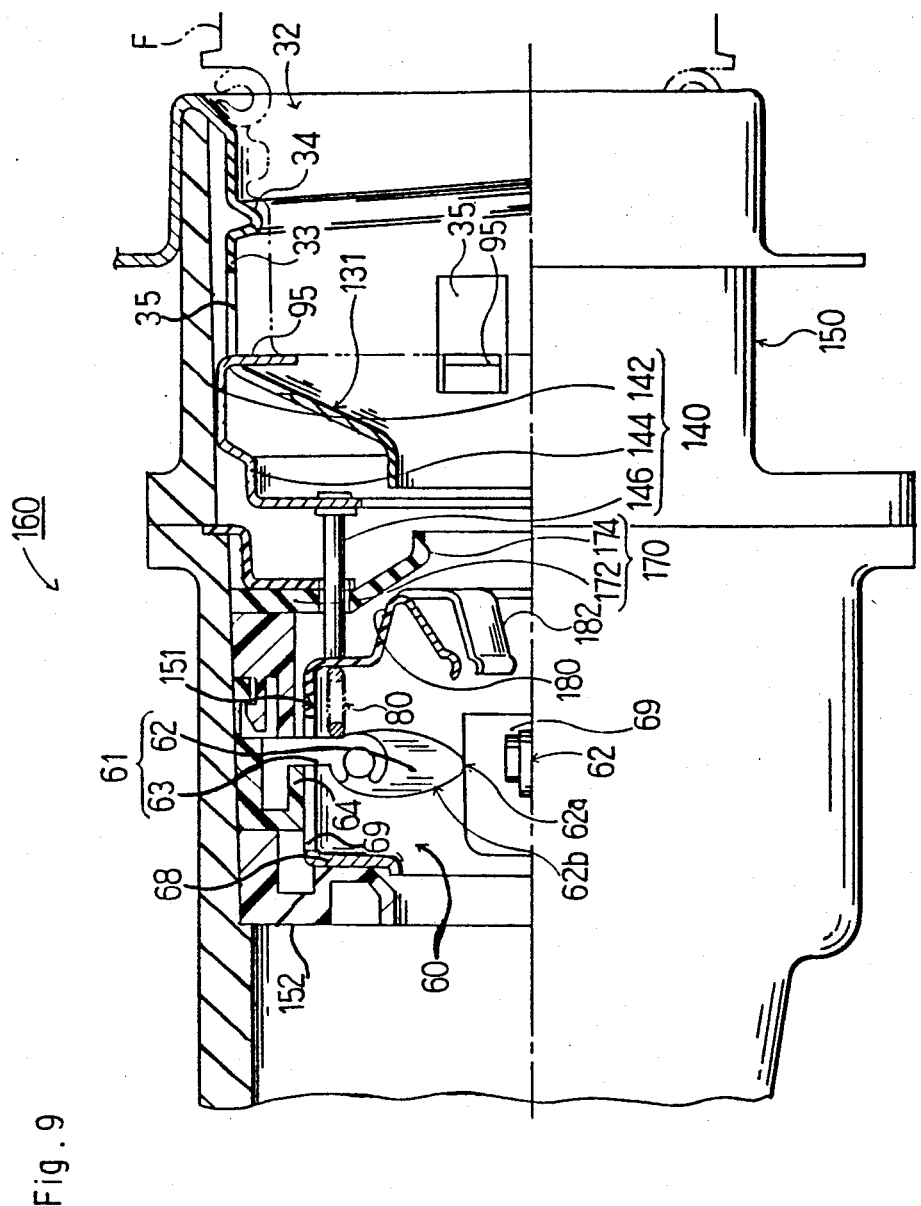
FIG. 9 is a semi-sectional view of a fuel injection port 160 in a third embodiment.
Figure 10:
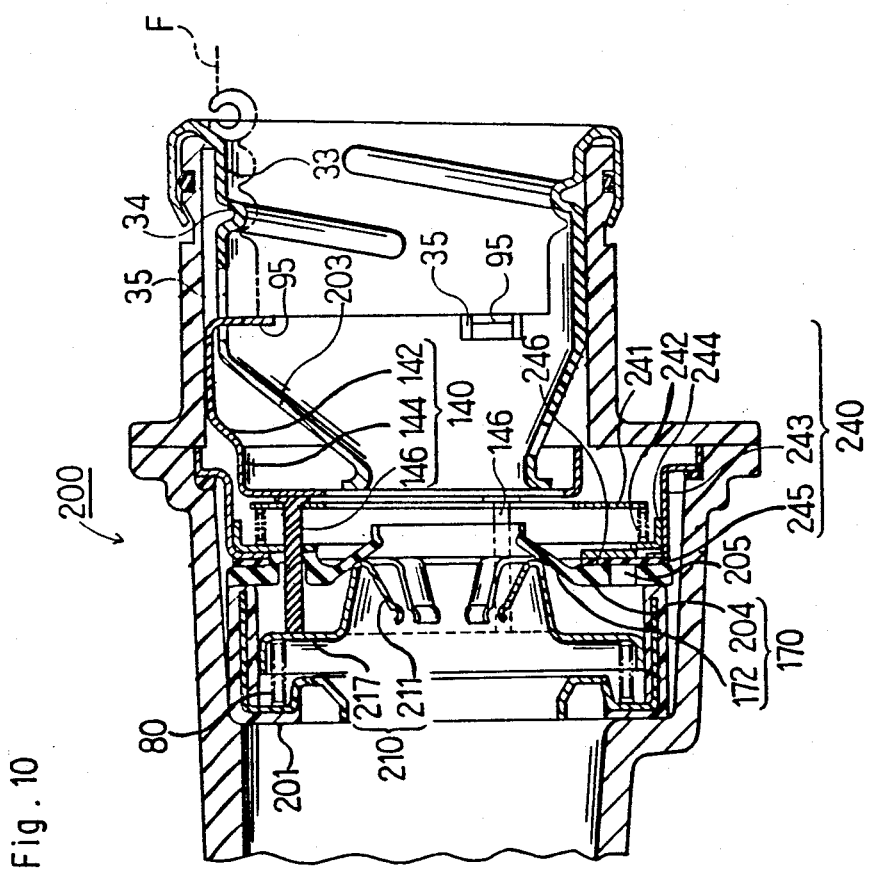
FIG. 10 is a sectional view illustrating state that a fuel cap F is inserted in a fuel injection port 200 in a fourth embodiment.

Third embodiment (FIG. 9)

A fuel injection port 160 of this embodiment is characterized in that a seal member 170 is fixed and a seal member enlarging surface 180 can be moved. Construction of other parts is essentially the same as that of the fuel injection part 120 of the second embodiment.

The seal member 170 is an annular member made of NBR, and composed of a base portion 172 with large diameter, and a tapered seal member body 174 continuing from the base portion 172.

The base portion 172 is fixed to the inside of the inner circumferential surface of the casing 150.

The seal member body 174 has the inner diameter dimension smaller than the outer diameter dimension of the nozzle 21. Consequently, when the nozzle 21 is inserted in the fuel injection port 160, the seal member body 174 to construct the inner circumferential surface of the seal member 170 continues to the outer circumferential surface of nozzle 121 in circumferential direction and is closely contacted therewith.

The seal member enlarging surface 180 corresponds to outside surface of a second guide member 182 extending in V-like cross-section from the right end of the cam follower member 151 in the figure.

According to the fuel injection port 160 in such construction, as shown in FIG. 9, when the fuel cap F is installed to the inlet 32, the second moving member 140 pushed the cam follower member 151 to the left side in the figure. Thereby the seal member enlarging surface 180 is separated from the seal member 170.

If the fuel cap F is removed, the pushing by the second moving member 140 is released and the cam follower member 151 is moved to the right side in the figure by the spring 80, and the seal member body 174 is enlarged by the seal member enlarging surface 180. Consequently, when the nozzle 121 is inserted in the fuel injection port 160, the top end of the nozzle 21 does not interface with the seal member 170. Regarding this function, refer to FIG. 5.

If the nozzle 21 is further inserted, the first moving member 60 is actuated and the seal member enlarging surface 180 is separated again from the seal member 170. Regarding this function, refer to FIG. 6.

Fourth Embodiment (FIGS. 10~15)

A fuel injection port 200 of this embodiment is characterized in a first moving member 210 and a valve mechanism 240 in comparison with the fuel injection port 160 of the third embodiment. Other parts such as a stopper 201, a diameter decreasing portion 203 to guide the nozzle 21, a base portion 204 of the seal member 170 and the like are slightly changed in the design but performs equivalent function to those of the third embodiment.

Figure 11:
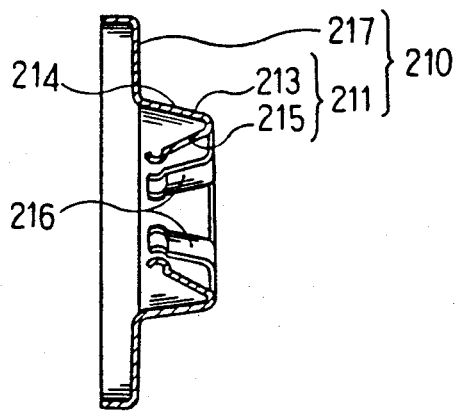
FIG. 11 is a sectional view of a first moving member 210.
Figure 12:
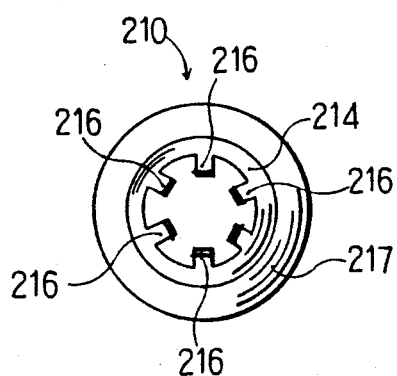
FIG. 12 in a front view of the first moving member 210.

The first moving member 210 has structure where the cam member 61 and the abutting portion 68 of the cam follower member 65 are omitted from that of the third embodiment. That is, as shown in FIGS. 11, 12, the first moving member 210 is composed of a guide member 211 with V-like cross-section and a flange member 217, and the axial line of the first moving member 210 is nearly coincident with the axial line of the casing 150 and the first moving member 210 can be moved in its axial direction.

The guide member 211 comprises a seal protective portion 213 at the outer circumferential side in the figure and a nozzle receiving portion 215 at the inner circumferential side, and is formed integrally together with the flange member 217 by sheet metal having spring elasticity.

Figure 14:
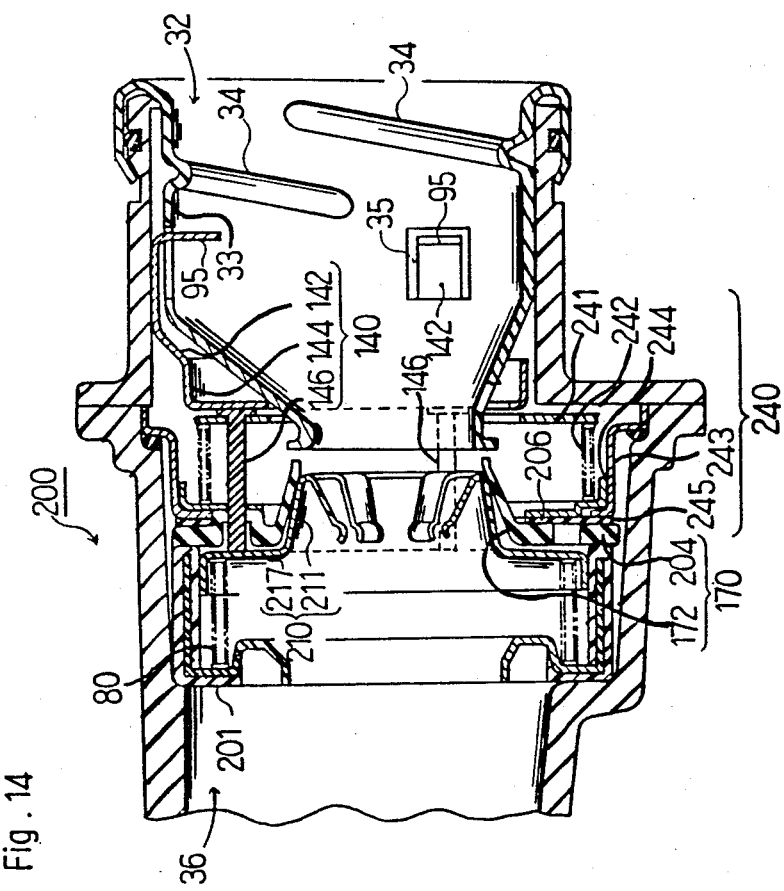
FIG. 14 is a sectional view illustrating state that the fuel cap F is removed from the fuel injection port 200 in the fourth embodiment.

The seal protective portion 213 is of taper form, an its small diameter portion at the right end has outer diameter dimension larger than the outer circumferential surface of the nozzle 21. Consequently, the outside surface of the seal protective portion 213 (the seal member enlarging surface 214) abuts on the seal member 170, the seal member 170 is enlarged as shown in FIG. 14. Thereby when the nozzle 21 is inserted in the fuel injection port 200, the top end of the nozzle 21 does not interfere with the seal member 170. A slit may be formed in the seal protective portion 213 from the viewpoint of securing ① light weight and ② flexibility of the nozzle receiving portion 215.

The nozzle receiving portion 215 is a belt-shaped member, and six nozzle receiving portions 215 extend from the right end of the seal protective portion 213 in the figure and are turned to the inside. Further the free end of each nozzle receiving portion 215 is bent to the outside. The inner circumferential surface of each nozzle receiving portion 215 (the nozzle receiving surface 216) is positioned on surface of the imaginary circular truncated cone, and small diameter dimension the surface of the imaginary truncated cone is smaller than that of the outer circumference of the nozzle 21. Since each nozzle receiving portion 215 is formed by material having spring elasticity, when the nozzle 21 is inserted in the fuel injection port 200, the nozzle receiving surface 216 is in tight fit state having spring elasticity to the outer circumferential surface of the nozzle 21. Thereby the guide member 211 does not slide on the nozzle 21 but follows this and is moved to the back side of the fuel injection port 200 (to the left side in the figure). Stepped portion is provided on the top end of each nozzle receiving portion 215. Thereby engagement of the nozzle receiving portion 215 with the nozzle 21 becomes more secure.

Periphery of the flange member 217 is bent to the left side in the figure, and becomes the slide pair to the inner circumferential surface of the stopper 201. In order to improve the slide to the stopper 201, the periphery of the flange portion 217 is preferably coated with resin material or the like.

Figure 13:
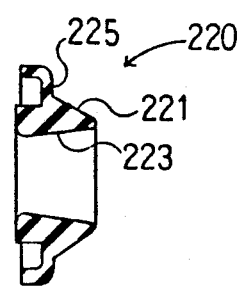
FIG. 13 is a sectional view of a first moving member 220 as a modification.

In the above-mentioned embodiment, although the first moving member 210 is made of sheet metal, of course, this may be formed by resin material having spring elasticity. If the first moving portion 210 is provided with the seal member enlarging surface to prevent contacting of the seal member 170 and the top end of the nozzle 21, and the nozzle receiving surface in tight fit having spring elasticity to the outer circumferential surface of the nozzle 21, its constitution is not particularly limited. For example, the first moving member 220 wholly made of soft synthetic resin shown in FIG. 13 may be used. In FIG. 13, numeral 221 designates a seal member enlarging surface, numeral 223 designates a nozzle receiving surface, and numeral 225 designates a flange member respectively.

The valve mechanism 240 is composed of a retainer 241, a compression coil spring 242, an outside pushing plate 243, an inside pushing plate 244 and a valve 245.

Figure 15:
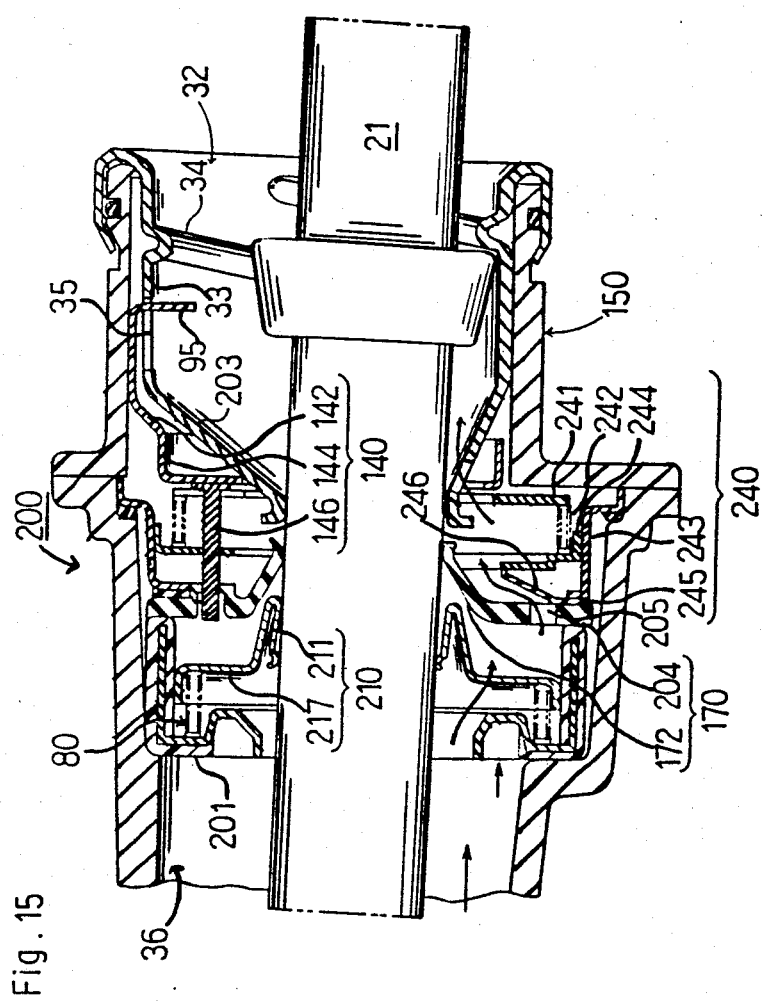
FIG. 15 is a sectional view illustrating a valve mechanism 200 which releases the tank inner pressure.

The valve 245 abuts on a base portion 204 of the seal member 170, and covers a through hole 205 bored on the base portion 204. The outside pushing plate 243 urges the outer circumference of the valve 245 to the base portion 204 and fixes the outer circumferential portion. In the valve 245, portion 246 to cover the through hole 205 is pushed to the side of the base portion 204 by the inside pushing plate 244. The force of the inside pushing plate 244 to push the valve 245 is supplied by the spring 242. Thereby the valve 245 normally closes the through hole 205 formed on the base portion 204 (refer to FIGS. 10, 14). However, when the tank inner pressure rises, the inside pushing plate 244 is moved to the right side in the figure as shown in FIG. 15. Thereby the portion 246 closing the through hole 205 of the valve 245 is opened and the inside of the tank communicates with the outside air. Consequently the inner pressure of the fuel tank in released.

Figure 16:
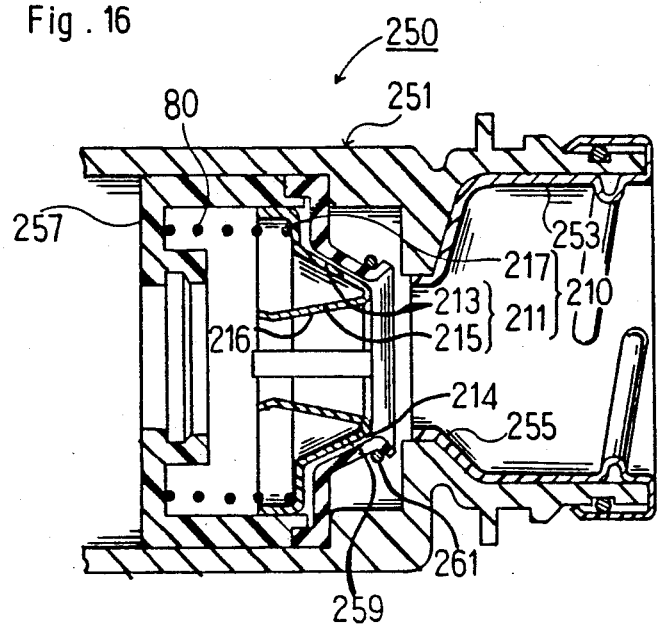
FIG. 16 is a sectional view of a fuel injection port 250 in a fifth embodiment.
Figure 17:
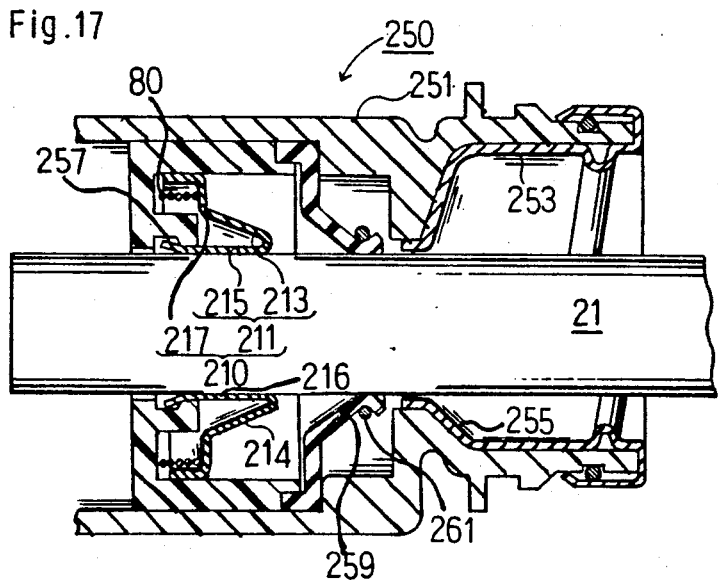
FIG. 17 is a sectional view illustrating state that the nozzle 21 is inserted in the fuel injection port 250.

Fifth Embodiment (FIGS. 16, 17)

A fuel injection port 250 of this embodiment is that which omits the second moving member 140 and the valve mechanism 240 in comparison to the fuel injection port 200 of the fourth embodiment. Other parts such as a casing 251, a cover 253, a diameter decreasing portion 255, a seal member 259 and the like are slightly changed in the design but performs equivalew function to those of the fourth embodiment essentially. A ring spring 261 is externally installed to the seal member 259 so as to maintain the durability.

It can be said that the fuel injection port 250 in this embodiment is type with the least part number.

What is claimed is:

1. A fuel injection port comprising:
   a cylindrical casing provided with an inlet to insert a fuel injection nozzle and an outlet continuing to a fuel tank;
   a nozzle guide means fixed to inner circumferential surface of said casing and having a guide port to pass said nozzle therethrough;
   an annular seal means positioned to the back side of said nozzle guide means for sealing outer circumferential surface of said nozzle;
   a seal means enlarging surface arranged face to said seal means;
   a biasing means for making one abut on the other among said seal means and said seal means enlarging surface and for enlarging the inner circumferential surface of said seal means at least immediately before said nozzle is inserted in the furel injection port; and
   a moving means for moving one in direction separating from the other among said seal means and said seal means enlarging surface in interlocking with insertion of said nozzle against biasing force of said biasing means and for releasing the enlarging of said seal means so that the inner circumferential surface of said seal means abuts on the outer circumferential surface of said nozzle.

2. A fuel injection port as defined in claim 1, wherein said moving means is positioned to the back side of said seal means within said casing.

3. A fuel injection port as defined in claim 2, wherein a cap to close the inlet is mounted on the inlet of said casing, and said casing in internally provided with a second moving means, which moves one in direction separating from the other among said seal means and said seal means enlarging surface in interlocking with the mounting of said cap against biasing force of said biasing means, and releases the enlarging of said seal means.

4. A fuel injection port as defined in claim 2, wherein said seal means is moved by said biasing means.

5. A fuel injection port as defined in claim 4, wherein said seal means comprising:
   an annular base portion positioned to the outside of the outer circumferential surface of said nozzle when said nozzle is inserted in the fuel injection port; and
   a cylindrical seal member body formed from the inner circumferential surface of said base portion to the back side to the fuel injection port so as to decrease diameter, said seal member being thinner than said base portion and having a plurality of axial ribs formed on the surface at the back side.

6. A fuel injection port as defined in claim 3, wherein said seal means is moved by said biasing means.

7. A fuel injection port as defined in claim 6, wherein said second moving means is provided with a portion abutting on said cap and a portion spaced from said portion abutting on said cap to the back side by prescribed distance and abutting on said seal means, and is arranged movable in the axial direction of said casing between said casing and said guide means.

8. A fuel injection port as defined in claim 4, wherein the surface at the back side of said guide means is said seal means enlarging surface.

9. A fuel injection port as defined in claim 4, wherein said moving means comprising:
   a cam means being rotated by abutting on said nozzle; and
   a cam follower means provided with a portion abutting on said cam means and arranged to the back side from said cam means, and fixed to said seal means.

10. A fuel injection port as defined in claim 9, wherein a cap to close the inlet is mounted on the inlet of said casing, and said casing is internally provided with a second moving means, which moves one in direction separating from the other among said seal means and said seal means enlarging surface in interlocking with the mounting of said cap against biasing force of said biasing means, and releases the enlarging of said seal means.

11. A fuel injection port as defined in claim 9, wherein a second guide means is provided, said second guide means being fixed on said cam follower member and positioned between said seal means and said cam means for guiding said nozzle to said cam means.

12. A fuel injection port as defined in claim 2, wherein a valve mechanism is provided, said valve mechanism making the inside of the tank communicate with the inlet side of said casing when the inner pressure of said fuel tank rises.

13. A fuel injection port as defined in claim 12, wherein said moving means is provided with an annular seal surface and a holding member continuing to said annular seal surface for holding said seal means airtightly, an annular valve seat member is provided in the inner circumferential surface of said casing on the outside position of said annular seal surface, and said valve mechanism is provided with an annular valve body for maintaining the air tightness state to the annular seal surface and sliding contacting therewith and a biasing means for biasing said valve body to the direction of said valve seat and performing seal between said valve body and said valve seat member.

14. A fuel injection port as defined in claim 13, wherein said moving means comprising:
   a cam means being rotated by abutting on said nozzle; and
   a cam follower means provided with a portion abutting on said cam means and arranged to the back side from said cam means, and fixed to said seal means.

15. A fuel injection port as defined in claim 2, wherein said seal means enlarging surface is moved by said biasing means.

16. A fuel injection port as defined in claim 15, wherein a cap to close the inlet is mounted on the inlet of said casing, and said casing is internally provided with a second moving means, which moves said seal means enlarging surface in direction separating from said seal means in interlocking with the mounting of said cap against biasing force of said biasing means, and releases the enlarging of said seal means.

17. A fuel injection port as defined in claim 16, wherein said second moving means is provided with a portion abutting on said cap and a portion spaced from said portion abutting on said cap to the back side by prescribed distance and abutting on said seal means, and is arranged movable in the axial direction of said casing between said casing and said guide means.

18. A fuel injection port as defined in claim 15, wherein said moving means is formed by a member with V-like cross-section having spring elasticity, and the inside portion is made an abutting portion on said nozzle and the outer surface of the outside portion is made a seal means enlarging surface.

19. A fuel injection port as defined in claim 16, wherein a valve mechanism is provided, said valve mechanism making the inside of the tank communicate with the inlet side of said casing when the inner pressure of said fuel tank rises.

* * * * *